United States Patent [19]
Moliner

[11] Patent Number: 5,862,964
[45] Date of Patent: Jan. 26, 1999

[54] UNIVERSAL LOAD-CARRYING UTILITY RACK FOR VEHICLES

[75] Inventor: Michael Moliner, Kingsbury, Canada

[73] Assignee: SportRack International Inc., Granby, Canada

[21] Appl. No.: 807,530

[22] Filed: Feb. 28, 1997

[30]  Foreign Application Priority Data

Mar. 1, 1996 [CA] Canada .................................... 2186814

[51] Int. Cl.$^6$ .................................................. B60R 9/058
[52] U.S. Cl. ............................................ 224/329; 224/322
[58] Field of Search .................................... 224/329, 331, 224/330, 322, 309, 316

[56]     References Cited

U.S. PATENT DOCUMENTS

| | | | |
|---|---|---|---|
| 4,684,049 | 8/1987 | Maby et al. ............................ | 224/329 |
| 4,809,943 | 3/1989 | Taschero ................................ | 224/329 |
| 4,995,538 | 2/1991 | Marengo ................................ | 224/329 |
| 5,115,955 | 5/1992 | Dallaire et al. . | |
| 5,137,195 | 8/1992 | Walter . | |
| 5,350,097 | 9/1994 | Walter . | |

*Primary Examiner*—Linda J. Sholl
*Attorney, Agent, or Firm*—Rader, Fishman & Grauer PLLC

[57]     ABSTRACT

A utility rack provided for carrying loads on vehicles, such as skis, snowboards, bicycles, watersport equipment, lumber, etc., comprises an elongated carrier bar, legs at each end of the carrier bar and adapted to take support on the vehicle, strap and hook assemblies for removably securing the utility rack to the vehicle, a rack-and-pinion ratchet adjustment and locking mechanism in the carrier bar for selectively withdrawing the straps towards the legs and into the carrier bar such as to tighten the hooks to the vehicle until the utility rack is in a firmly mounted position thereof on the vehicle, and for locking the straps in place thereby retaining the utility rack in its mounted position. The thin hooks are made of high strength tempered steel and are PVC coated. The carrier bar defines accessory receiving channels. The legs are provided with swivel feet. A lockable lever actuates the ratchet adjustment and locking mechanism. The straps are angled at about 30° to 40° to the horizontal, preferably around 30°, and are flexible yet solid for substantially following the contour of the roof line of the vehicle at the lateral curved edges thereof.

16 Claims, 6 Drawing Sheets

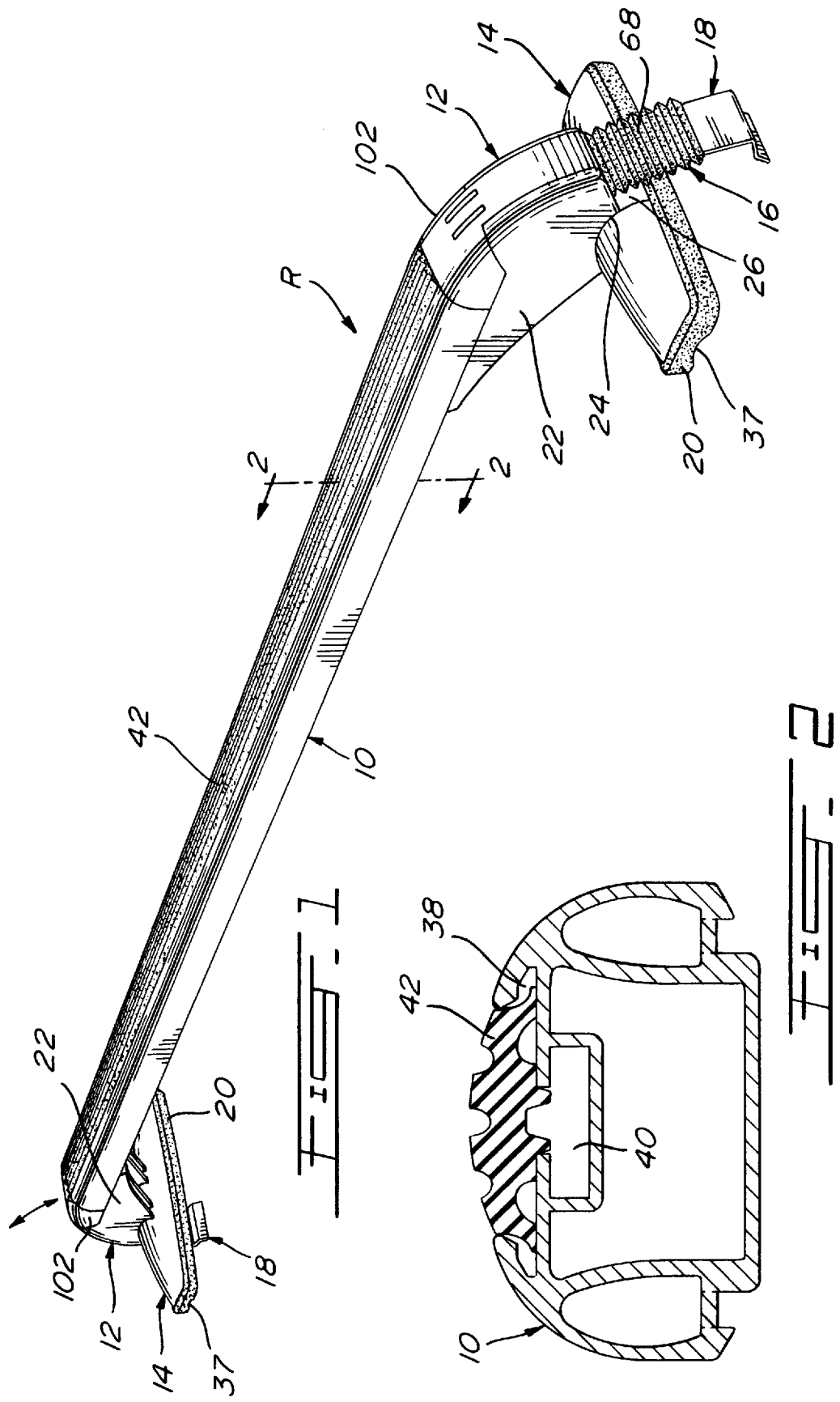

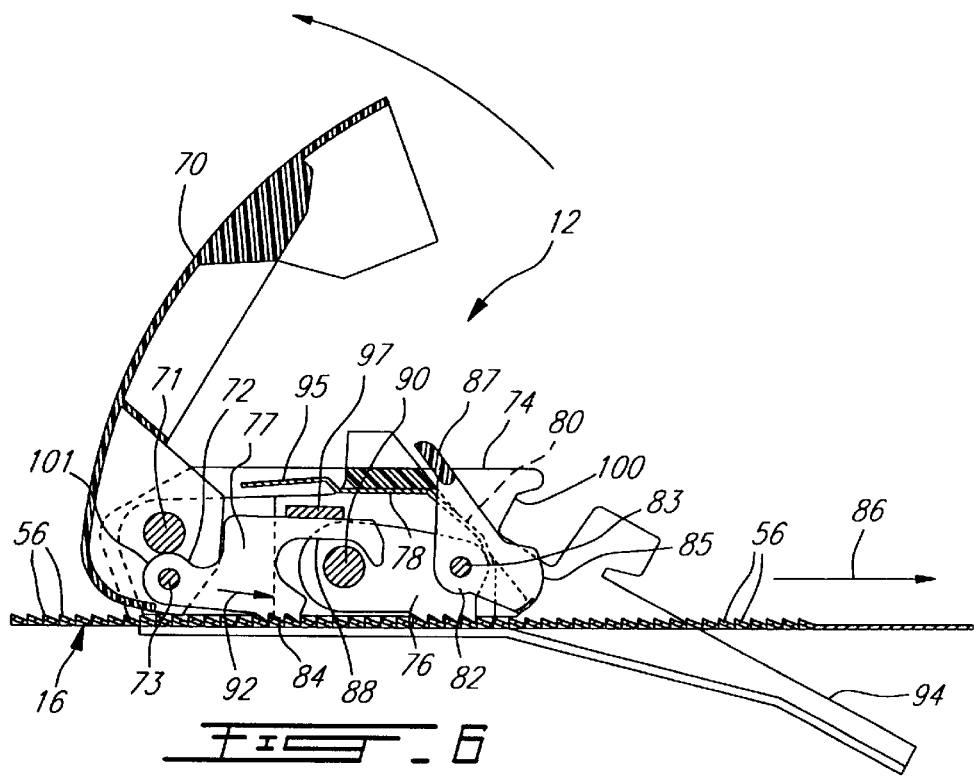
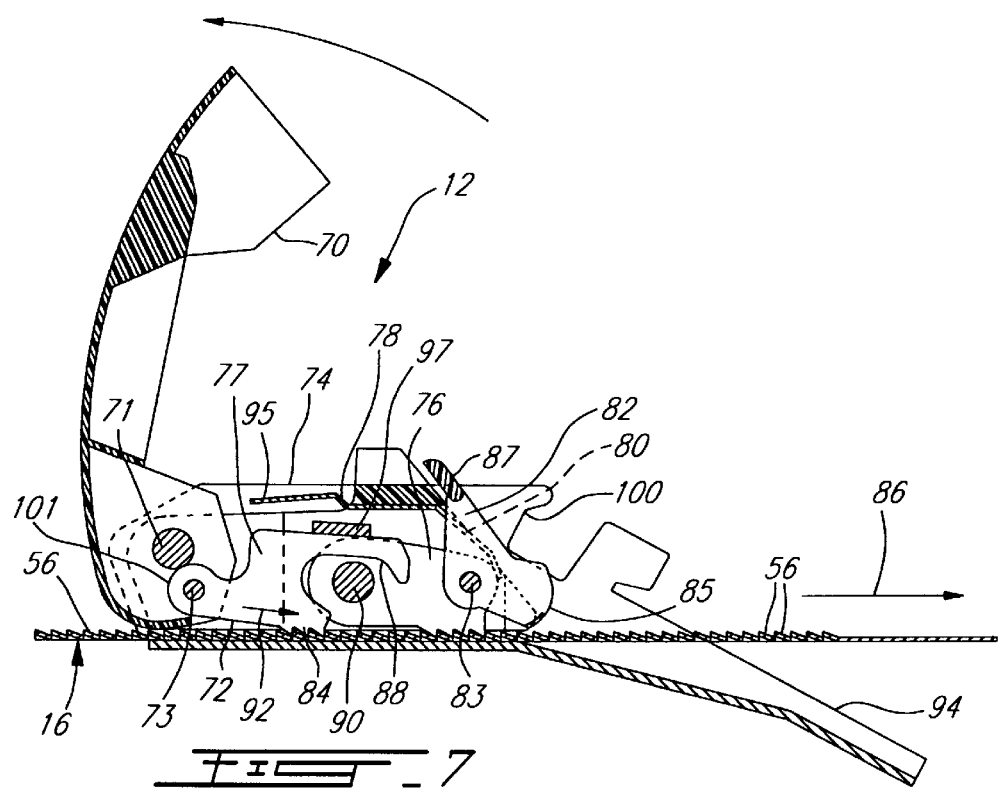

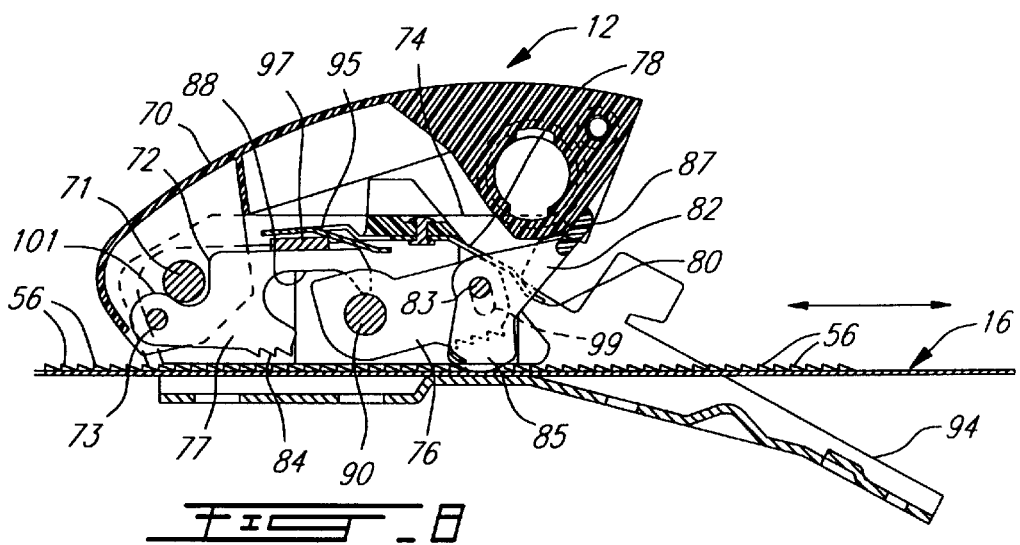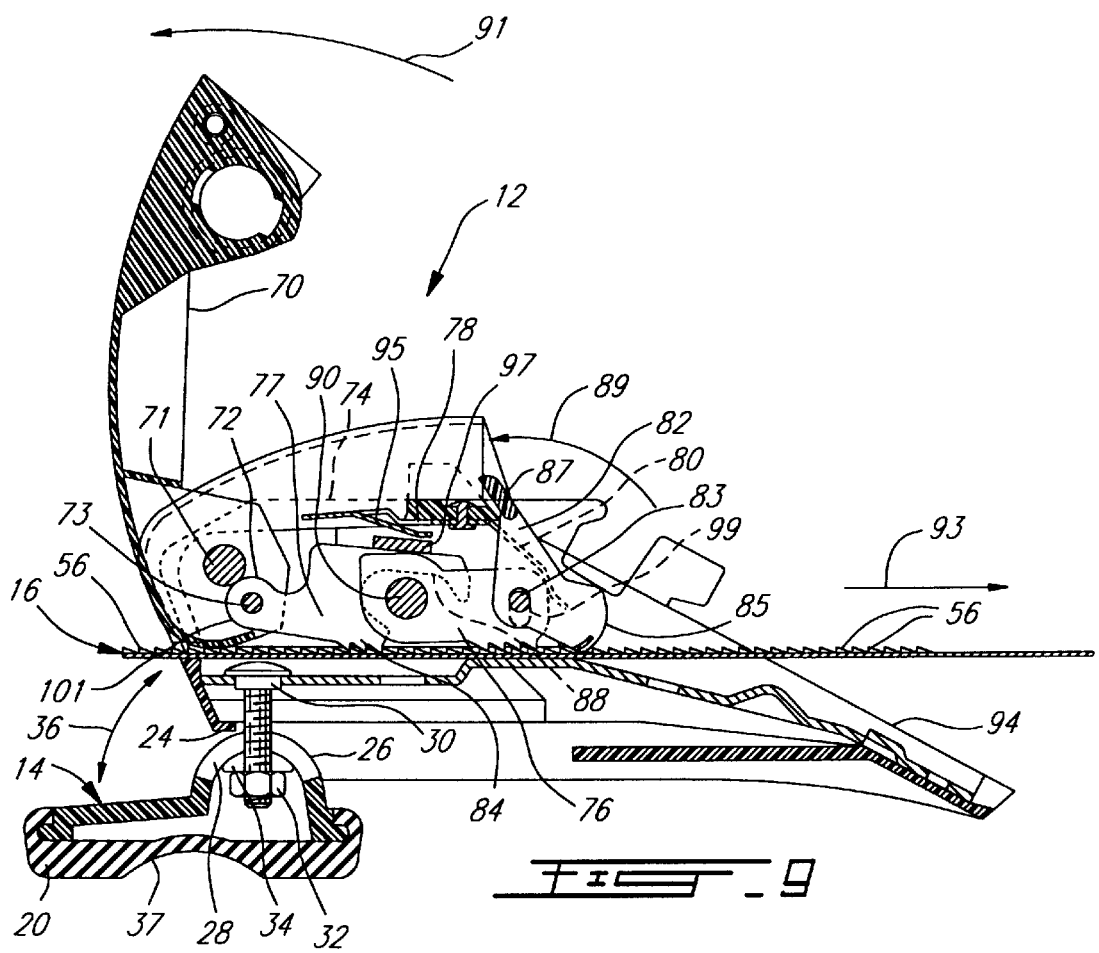

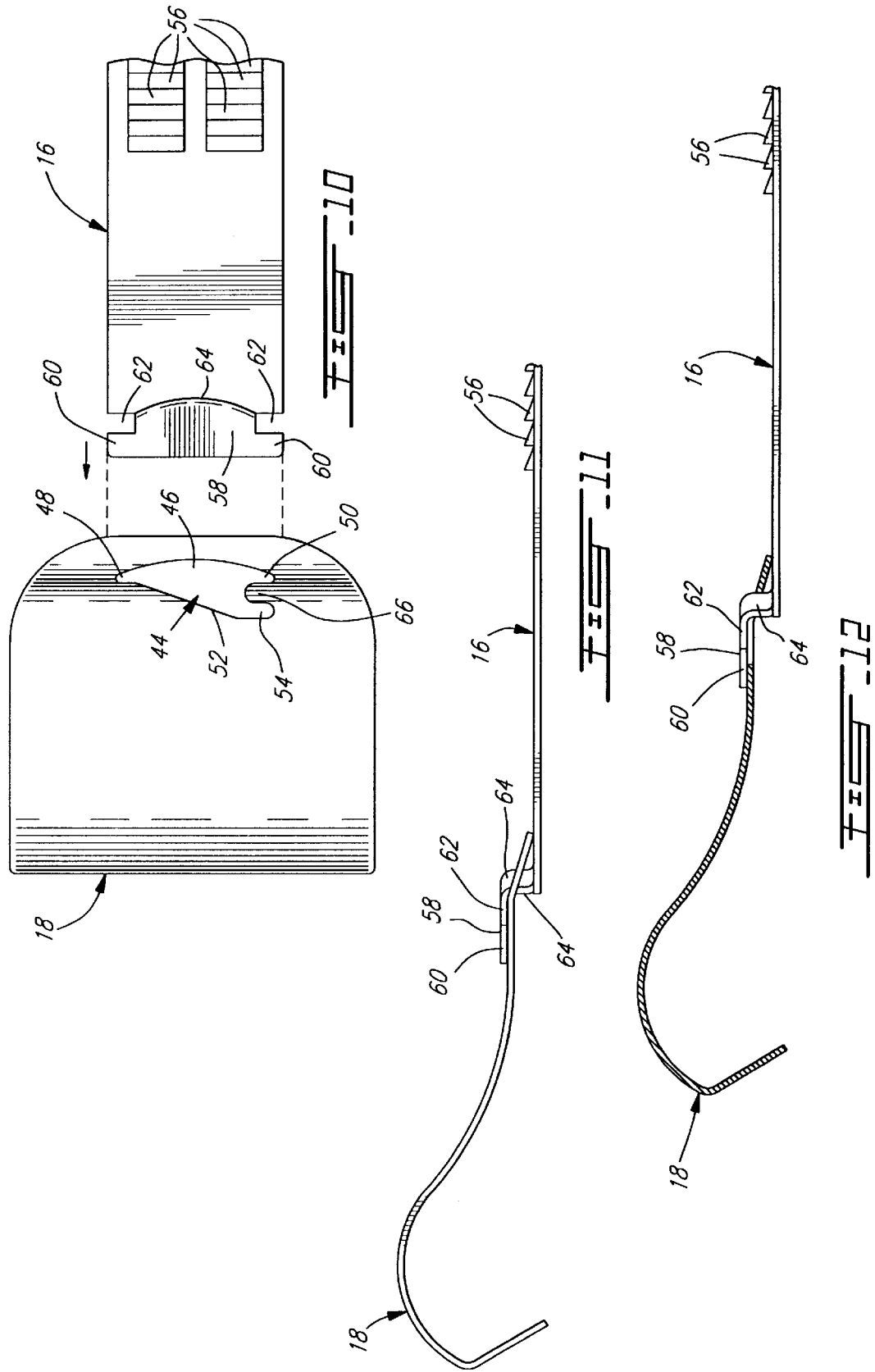

UNIVERSAL LOAD-CARRYING UTILITY RACK FOR VEHICLES

BACKGROUND OF THE INVENTION

1. Field of the Invention

The present invention relates to utility or carrier racks for use on vehicles and, more particularly, to a novel rooftop load-carrying rack.

2. Description of the Prior Art

Various types of utility racks are known for carrying various equipment over the rooftop of a vehicle. Typically, the utility rack consists of a bridge member which extends transversally above the roof of the vehicle and which is detachably secured at its opposite ends to the body of the vehicle, such as to the door frames or to the gutters of the vehicle. The utility rack is adapted for releasably securing thereon various often sport-related equipment, e.g., skis, bicycles, etc.

For example, U.S. Pat. No. 5,115,955 issued on May 26, 1992 to Dallaire et al. discloses a ski rack comprising a support base member having one or more adjustable ski retention posts secured thereto and extending vertically thereabove. One or more abutment members extend vertically from the base member and are disposed in a spaced aligned relationship with respective ones of the retention posts. The retention posts each have flexible biasing fingers which project toward the abutment members in a ski-receiving space defined between the posts and the abutment members for applying clamping pressure against a pair of skis support on the base member in the ski-receiving space. A bridge member extends above and across the abutment members and the retention posts. Attachment elements are disposed adjacent opposed ends of the ski rack for securing the same to a vehicle and, more particularly, a strap which extends longitudinally throughout the bridge member of the ski rack is provided at its ends protruding from the ski rack with hook which are adapted to be engaged with the gutters of the vehicle with the strap comprising an intermediate rubber section within the housing of the bridge member, whereby once the hooks have been engaged on the gutters, the resilient rubber strap urges the hooks inwardly towards the ski rack thereby firmly securing the ski rack to the vehicle's gutters.

In U.S. Pat. No. 5,137,195 issued on Aug. 11, 1992 to Walter, there is disclosed a utility rack attachable to the rooftop of vehicle of various sizes. More particularly, the utility rack includes a carrier bar containing a hollow compartment. A rubber band or a spring inside this hollow compartment is attached at either end (or at both ends thereof) to a non-elastic strap which extends from the hollow compartment and outside of the carrier bar to hooks or other anchoring devices which can be detachably secured to anchor points on the vehicle and, more particularly, to the vehicle door frames. Locking mechanisms are mounted on the carrier bar to lock the non-elastic straps to the carrier bar by a pawl mechanism or by a pin. Therefore, the utility rack is positioned on the vehicle rooftop and the non-elastic straps are then pulled by their respective hooks such as to engage these hooks to the anchor points of the vehicle with the rubber band resiliently urging the hooks inwardly towards the carrier bar for securing the utility rack to the vehicle. Then, the locking of the non-elastic straps to the carrier bar is achieved by actuating a pawl and ratchet mechanism or a pin-perforated strap locking mechanism and, more particularly, these locking mechanisms are actuated by the pivot of a pair of arms of the utility rack which are used to hold gear thereon.

SUMMARY OF THE INVENTION

It is therefore an aim of the present invention to provide an improved utility rack adapted to be rapidly secured to a vehicle.

It is also an aim of the present invention to provide an improved utility rack adapted to be detachably mounted to the rooftop of a vehicle and to be locked in this position to prevent the utility rack from being removed and stolen.

It is a further aim of the present invention to provide an improved utility rack adapted to be detachably mounted to the rooftop of a vehicle by way of a ratchet mechanism adapted to tighten straps of the rack anchored to the vehicle body and provided with an integrated locking mechanism to prevent straps from loosening during the tightening operation.

It is a still further aim of the present invention to provide a utility rack having straps anchored to the vehicle body and extending generally at an angle of 30° to 40° with respect to the horizontal such that the pulling forces of the rack on the straps more directly contribute to firmly securing the rack to the vehicle.

Therefore in accordance with the present invention, there is provided a utility rack for carrying loads on vehicles, comprising an elongated carrier means, support means provided for supporting said carrier means on the vehicle, rack anchoring means for removably securing said utility rack to the vehicle, adjustment and locking means for selectively tightening said anchoring means to the vehicle such that said utility rack is in a mounted position thereof and for retaining said utility rack in said mounted position.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a perspective view of a utility rack in accordance with the present invention;

FIG. 2 is a cross-sectional view taken along line 2—2 of FIG. 1 and showing an accessory receiving channel thereof;

FIGS. 5 to 7 are cross-sectional views, similar to FIG. 4, but showing the lever of the ratchet mechanism in various sequential positions thereof for effecting the tightening of the utility rack onto the vehicle rooftop by retraction of the rack's straps which are attached to hooks anchored to the vehicle;

FIG. 8 is a cross-sectional view taken along line 8—8 of FIG. 3 and showing a release position of the strap;

FIG. 9 is a cross-sectional view similar to FIG. 8 and showing the lever in an alternate position for returning the ratchet mechanism in a locked position with respect to the strap;

FIG. 10 is a top plan view of an outer end of the strap and of the hook in the process of being engaged to the strap;

FIG. 11 is a front elevational view of the strap and hook of FIG. 10, but shown in an engaged position thereof; and FIG. 12 is a vertical cross-sectional view taken centrally through the strap and hook assembly of FIG. 11.

DESCRIPTION OF THE PREFERRED EMBODIMENTS

Figure 3:
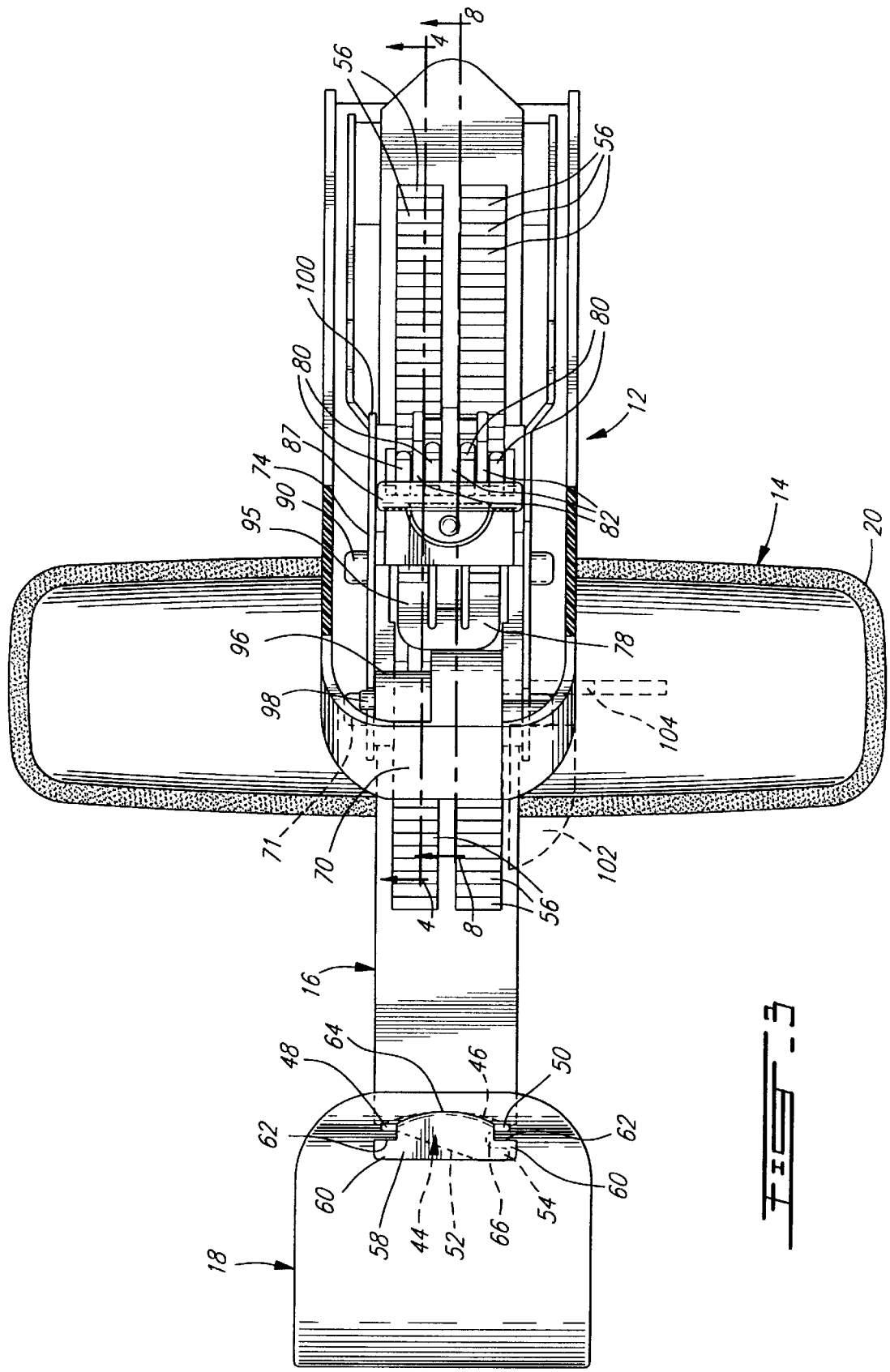
FIG. 3 is a fragmented top plan view of one of the ends of the utility rack shown with a lever of a ratchet mechanism thereof in a raised position.

FIG. 1 is a perspective view of a utility rack R in accordance with the present invention and adapted to be transversely disposed on the rooftop of a vehicle in a known fashion, with two such utility racks being typically used in a spaced apart and parallel relationship on the roof of the vehicle. The utility rack R comprises the following main components: an elongated carrier bar 10, a pair of utility rack retention devices 12 mounted at the ends of the carrier bar 10, a pair of swivel feet 14 mounted at the lower ends of the retention devices 12, a pair of straps 16 lockable within the retention devices 12 and extending outwardly therefrom at an angle of about 30° to 40° to the horizontal, and a pair of hooks 18 detachably mounted to the outer free ends of the straps 16 and adapted for engagement to the vehicle body on each side thereof and, more particularly, at the upper door frames of the vehicle, i.e. at the lateral edges of the roof.

Each swivel foot 14 is made of a plastics material (for instance, by injection molding) and is provided with a removable protective pad 20 (see FIGS. 1 and 9) made of a cushioned rubber-like material which frictionally engages the rooftop of the vehicle while preventing the utility rack R from causing any damage thereto. As best seen in FIG. 9, each retention device 12 includes a housing 22 which defines at an outer lower end thereof a concave surface 24, whereas the swivel foot 14 defines at an upper end thereof a convex surface 26 which defines a transversal groove 28. A bolt 30 connects the housing 22 of the retention device 12 to the swivel foot 14 with a nut 32 and a half-moon washer 34 being provided on the underside of the convex surface 26 of the swivel foot 14 and opposite the groove 28 thereby allowing for the swivel foot 14 to pivot with respect to the retention device 12 as per arrow 36 of FIG. 9 with the bolt 30 displacing along the groove 28. The nut 32 is tightened obviously with some play between the concave and convex surfaces 24 and 26 such as to allow a relative pivot therebetween. The pad 20 is made of a low-profile, soft rubber which will not scratch the paint of the vehicle while providing for a non-slip surface. Its grooves 37 reduce accumulation of grime between the swivel foot 14 and the vehicle's rooftop. The grooved sole of the pad 20 fits all types of roof lines and its geometry allows for mounting over roof ribs.

Referring to FIGS. 1 and 2, the carrier bar 10 which is, for instance, an aluminum extrusion defines upper and lower accessory-receiving channels 38 and 40, respectively, which are adapted to receive various accessories in order to allow for the utility rack R to carry various equipment, e.g., skis, snow boards, bicycles, sale boards, kayaks, canoes, etc. Accordingly, various types of article securing devices can be mounted to the carrier bar 10 by slidable displacement along an appropriate one of the upper and lower channels 38 and 40. In FIG. 2, there is shown a substantially hard support 42 made of extruded PVC and inserted in the upper channel 38 of the carrier bar 10 to allow the utility rack R to be used for carrying other articles, such as plywood panels, lumber, etc., without damaging the finish of the carrier bar 10 while providing friction between the carrier bar 10 and the article carried thereby.

Turning to FIGS. 10 to 12, the hook 18 defines a composite opening 44 which includes a transversal slot 46 having opposed first and second slot ends 48 and 50, respectively, and an angled slot 52 merging with the transversal slot 46 and sharing the first end 48 thereof with the angled slot 52 having a second end 54. The strap 16 defines two parallel bands of ratchet teeth 56 and a notched outer or free end 58 comprising a pair of retaining transversal side arms 60 and adjacent notches 62. To engage the free end 58 of the strap 16 in the composite opening 44 of the hook 18, the side arms 60 are first engaged in the angled slot 52 and thus through the ends 48 and 54 thereof with the strap being introduced in the angled slot 52 from the underside of the hook 18 and at an angle respective thereto. Then, the side arm 60 lying next to the second end 54 is brought towards the second end 50 of the transversal slot 46 by sliding its notch 62 over tongue 66 defined by the hook 18 between its the slot ends 50 and 54.

As the end 58 of the strap 16 is offset from the remainder thereof by a shoulder 64, the strap 16 can be brought in substantial alignment with the hook 18, as seen in FIGS. 11 and 12. It is noted that the hook 18 in the illustrated embodiment corresponds generally to that of U.S. Pat. No. Design U.S. Pat. No. D349,641 issued on Aug. 16, 1994 to Moliner. Various other hooks can, however, be used depending on the configuration of the anchoring point on the vehicle, such as the hooks of U.S. Pat. Nos. Design U.S. Pat. No. D349,040 (issued on Jul. 26, 1994 to Moliner), U.S. Pat. No. D348,213 (issued on Jun. 28, 1994 to Moliner) and U.S. Pat. No. D346,951 (issued on May 17, 1994 to Oberson).

It is noted that the straps 16 are made of stainless steel and that the hooks 18 are made of a metallic material preferably covered with a plastic or rubber-like coating in order to prevent damage to the vehicle at the anchoring points of the utility rack R. As seen in FIG. 1, a portion of the strap 16 which extends between the housing 22 of the retention device 12 and the hook 18 is covered by a flexible accordion sleeve 68 which is made of PVC and by blow molding such as to protect the strap 16 and its ratchet teeth 56 as well as to provide an aesthetic finish to the utility rack R.

We now turn to the description of the retention device 12 which is used to tighten, i.e. to retract the strap 16 and thus the hook 18 in order to firmly secure the utility rack R to the vehicle. More particularly, the retention device 12 is provided with a toothed mechanism actuated by a lever for engaging the ratchet teeth 56 of the strap 16 in order to pull on the strap 16 such that it is displaced inwardly towards the center of the roof of the vehicle, until the hook 18 is solidly engaged to the vehicle. The toothed mechanism also locks the strap 16 in place and can be actuated in order to become disengaged from the strap 16 and allow the same to be withdrawn from the housing 22 of the retention device 12 when it is desired, for instance, to remove the utility rack R from the vehicle. The lever can be locked to the retention device 12 in order to prevent it from being actuated and to prevent the release mechanism to be handled for releasing the strap 16 which would thus allow the utility rack R to be stolen. The details of the retention device 12 and its ratchet and locking mechanism are illustrated in FIGS. 3 through 9.

Therefore, with reference generally to FIGS. 3 to 9, a lever 70 is pivotally mounted at 71 to the housing 22 and is adapted to displace upon actuation thereof a grip or carriage 72 which is pivotally mounted at a lower end of the lever 70 by pivot pin 73. The carriage 72 includes two parallel toothed arms 77 pivotally mounted at their outer ends to the pivot pin 73 and joined adjacent their inner ends by a horizontal transversal bridge 97. A bracket 74 is disposed within the housing 22 and carries a locking mechanism for the strap 16. More particularly, four toothed locking members 76 disposed side-by-side and parallel are pivotally mounted onto pin 90 to the bracket 74 and are urged downwardly into engagement with the ratchet teeth 56 of the strap 16 by way of a leaf spring 78 which includes four fingers 80 (see FIG. 3) which apply downward pressure on the toothed locking members 76.

It is noted that the two inner locking members 76 are slightly longitudinally offset with respect to the two outer locking members 76 and these inner locking members 76 define oblong openings 99 (see FIGS. 8 and 9) such that the reciprocal up-and-down displacements of the inner members 76 due the gradual advancement of the strap 16 and the ratchet teeth 56 thereof forcing the locking members 76 upwards against the force of the leaf spring 78 are offset by half a cycle with respect to the similar up-and-down displacements of the outer members 76 to ensure that two toothed locking members 76 at all times are engaged to the ratchet teeth 56 of the strap 16 during the tightening thereof.

As best seen in FIGS. 8 and 9, a release lever 82 is provided for disengaging, when pivoted to its position shown in FIG. 8, the locking members 76 from the ratchet teeth 56. More particularly, the release lever 82 is pivotally mounted at 83 to front ends of the locking members 76 such that by pivoting the release lever 82 to its position in FIG. 8, a cammed end 85 of the release lever 82 is urged against the strap 16 thereby causing the locking members 76 to raise above the ratchet teeth 56 of the strap 16 and thus disengage therefrom.

The release lever 82 can be returned to its neutral position of FIGS. 4 to 7 and 9 by manually pushing a grip 87 thereof outwardly as per arrow 89 in FIG. 9 or by pulling on the lever 70 as per arrow 91 in FIG. 9 as this causes the carriage 72 to push the strap 16 along arrow 93 (FIG. 9) with the strap 16 carrying inwardly therewith the cammed end 85 of the release lever 72.

By displacing the lever 70 and repeatedly through the sequence shown in FIGS. 4 to 7, thrust teeth 84 provided on the carriage 72 cause the strap 16 to displace along arrow 86 of FIGS. 6 and 7 while the inner and outer locking members 76 are alternatively engaged to the strap 16 to ensure that the strap 16 does not loosen.

Figure 4:
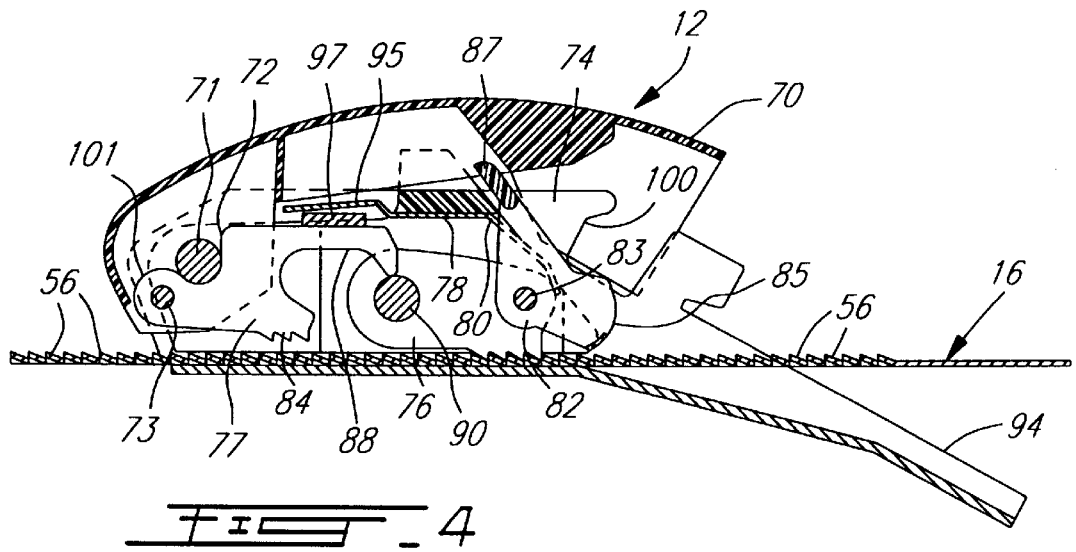
FIG. 4 is a cross-sectional view taken along line 4—4 of FIG. 3 but with the lever in a lowered position thereof.
Figure 5:
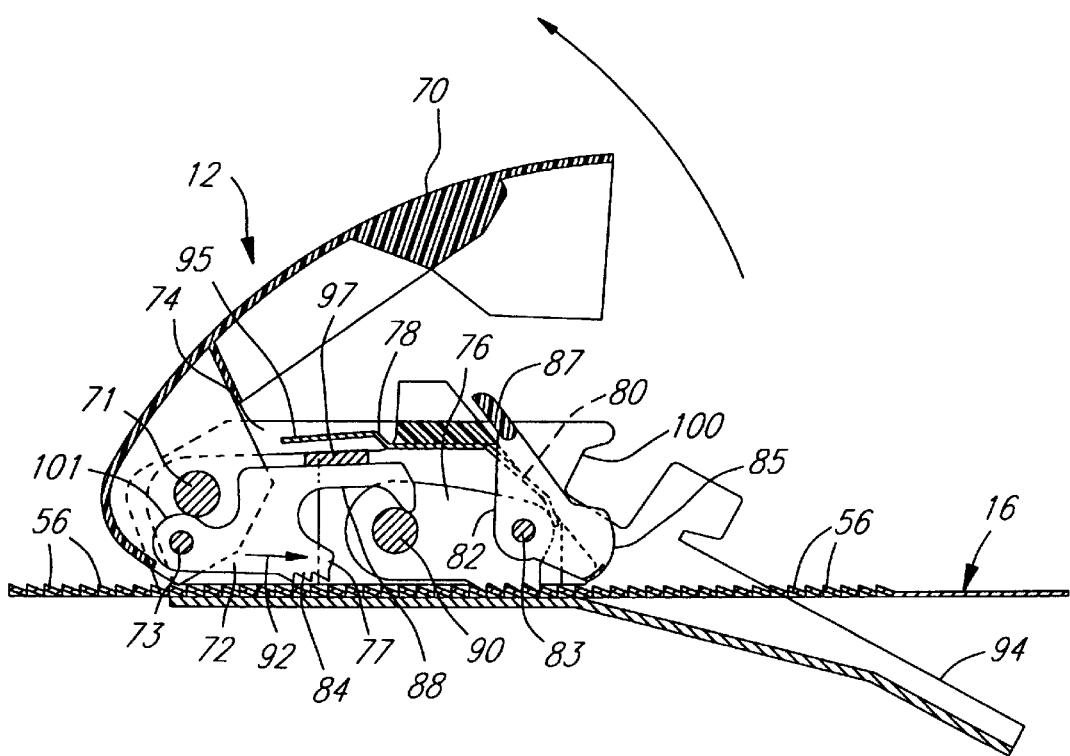

When the lever 70 is brought back down towards the locking members 76, a cam surface 88 defined in each arm 77 of the carriage 72 follows the pin 90 (onto which are pivotally mounted the locking members 76) such as to raise the thrust teeth 84 above the strap 16, as seen in FIGS. 4 and 8, and translationally displace the carriage 72 outwardly towards the hook 18 before the lever 72 is again pulled thereby displacing the carriage 72 inwardly with the thrust teeth 84 being lowered into engagement with the ratchet teeth 56 under the downward urge of a rear end 95 of the leaf spring 78 acting on the bridge 97 of the carriage 72 for a subsequent displacement of the strap 16 along arrow 86 in view of the displacement of the carriage 72 along arrow 92 of FIGS. 5 to 7. During the inner displacement of the carriage 72 seen in FIGS. 5 to 7 the displacement of the carriage 72 is also guided by the rear arcuate end 101 of each of its toothed arms 77 rolling around the pin 71 which causes the carriage 72 to lower towards the ratchet teeth 56 of the strap 16.

It is noted that, while the carriage 72 is retracted towards the hook 18 and that the thrust teeth 84 are thus disengaged from the strap 16, the teeth of the locking members 76 remain engaged with the ratchet teeth 56 of the strap 16 (see FIGS. 4 and 5) by way of the pressure of the leaf spring 78 such as to prevent the strap 16 from loosening, that is, displacing outwardly towards the anchoring point on the vehicle.

In FIGS. 4 to 9, it is noted that edge 94 of the housing 22 and thus the carrier bar 10 are, when the utility rack R is mounted on the vehicle rooftop, substantially horizontal whereby the strap 16 and the ratchet and locking mechanism of the retention device 12 are in fact basically oriented along the curvature of the lateral sides of the roof with the strap 16, for instance, extending in the retention device 12 at angle of about 30° to 40° at least opposite the carriage 72 and the locking members 76 thereof.

The lever 70 is provided with a barrel lock 96 (see FIG. 3) which can be rotated by way of a key 104 such as to displace a locking pin 98 thereof into and out of the recess 100 defined at the inner end of the bracket 74. Access to the barrel lock 96 is provided by a lock cap 102 pivotally mounted to the housing 22 of the retention device 12. In FIG. 3, the lever 70 is shown in a substantially upright position with part of the sides of the housing 22 being fragmented to see the inside mechanism of the retention device 12. Also in FIG. 3, the lock cap 102 is shown in its open position in phantom lines with the key 104 engaged in the barrel lock 96 being also shown in phantom lines. In reality, in FIG. 3, as the lever 70 is in a raised position, the lock cap 102 is in its open position shown in phantom lines with the key 104 being engaged in the barrel lock 96.

I claim:

1. A utility rack for carrying loads on vehicles, comprising an elongated carrier means, support means provided for supporting said carrier means on the vehicle, rack anchoring means for removably securing said utility rack to the vehicle, adjustment and locking means for selectively tightening said anchoring means to the vehicle such that said utility rack is in a mounted position thereof and for retaining said utility rack in said mounted position, wherein said anchoring means comprise non-extendable strap means adapted to be distally engaged to the vehicle, said strap means proximally comprising a series of ratchet teeth means, said adjustment and locking means comprising thrust teeth means adapted, when said adjustment and locking means are operated, to engage said ratchet teeth means and to selectively inwardly pull on said strap means such as to pull said strap means towards and relative to said carrier means and gradually tighten said utility rack onto the vehicle, said adjustment and locking means also comprising locking means adapted to retain said strap means in position during tightening of said strap means and also once said utility rack is in said mounted position.

2. A utility rack as defined in claim 1, wherein said support means comprise a pair of padded feet pivotally mounted to opposite ends of said carrier means and capable of swiveling with respect thereto to accommodate differently angled support surfaces of the vehicle.

3. A utility rack as defined in claim 2, wherein said ends and said feet define mating concave and convex surfaces which slidably cooperate to allow for a relative pivots therebetween, said feet each defining lower groove means which reduce accumulation of grime between said feet and the surfaces of the vehicle and which allow said feet to be mounted over ribs provided on these surfaces.

4. A utility rack as defined in claim 1, wherein said carrier means comprise a carrier bar defining longitudinally thereon upper accessory-receiving channel means.

5. A utility rack as defined in claim 1, wherein said anchoring means are provided at opposite ends of said carrier means and each comprise hook means adapted to engage the vehicle and strap means extending between said hook means and said carrier means at an angle of 30° to 40° relative to the horizontal.

6. A utility rack as defined in claim 5, wherein each said strap means is flexible and solid for substantially following contours of the vehicle, each said hook means being detachably mounted to said strap means by way of a T-shaped hook and a composite opening provided on one and the other of said hook means and said strap means.

7. A utility rack as defined in claim 1, wherein said adjustment and locking means are lockable such as to prevent unauthorized operation thereof aimed at loosening said strap means and releasing said utility rack from the vehicle.

8. A utility rack as defined in claim 1, wherein said adjustment and locking means are manually operable for selectively displacing said strap means with respect to said carrier means such as to release said utility rack from the vehicle.

9. A utility rack as defined in claim 8, wherein said strap means distally comprise hook means for engagement to the vehicle, said adjustment and locking means, when operated, inwardly pulling on said strap means such as to pull said hook means towards said carrier means and gradually tighten said utility rack onto the vehicle, said locking means comprising locking teeth means adapted to retain, by engagement with said ratchet teeth means, said strap means in position during tightening of said strap means and also once said utility rack is in said mounted position.

10. A utility rack as defined in claim 9, wherein said adjustment and locking means comprise tightening lever means and strap locking means, said lever means being pivotable such as to displace carriage means in a back-and-forth movement substantially parallel to said strap means, said thrust teeth means being provided on said carriage means and being adapted to be engaged with said ratchet teeth means during an inward displacement of said carriage means for inwardly displacing said strap means, said carriage means being outwardly displaceable by said lever means while said strap means remain in position, whereby said lever means are displaceable such as to repeatedly displace said carriage means along said back-and-forth movement thereby gradually displacing said strap means inwardly until said hook means are firmly engaged to the vehicle and said utility rack is thus in said mounted position.

11. A utility rack as defined in claim 10, wherein said lever means and said strap locking means are pivotally mounted respectively about first and second pin means, said carriage means define at least first and second cam surfaces adapted to cooperate respectively with said first and second pin means to respectively guide said thrust teeth means into engagement with said ratchet teeth means during inward displacement of said carriage means and to withdraw said thrust teeth means from said ratchet teeth means during outward displacement of said carriage means.

12. A utility rack as defined in claim 10, wherein said strap locking means comprise said locking teeth means engaged with said ratchet teeth means and are adapted to prevent said strap means from loosening when said carriage means are displaced outwardly by said lever means, said locking teeth being adapted to permit said strap means to be displaced inwardly by said carriage means.

13. A utility rack as defined in claim 12, wherein said locking teeth means are biased into engagement with said strap means and are slightly raised, ratchet-like, by said ratchet teeth means as said strap means are displaced inwardly.

14. A utility rack as defined in claim 13, wherein said at least two sets of locking means are provided, said sets being offset from each other such that, when one set is raised by said ratchet teeth means, the other set prevents said strap means from loosening, and vice-versa.

15. A utility rack as defined in claim 12, wherein release means are provided for manually withdrawing said locking teeth means of said strap locking means from said ratchet teeth means of said strap means thereby allowing said strap means to be displaced outwardly and thus loosened, whereby said utility rack can be removed from the vehicle.

16. A utility rack as defined in claim 15, wherein said release means comprise cammed means adapted, when said release means are manually pivoted into an operative position thereof, to bear against said strap means and cause said locking teeth means to raise and thus disengage from said ratchet teeth means; said release means, when said lever means are operated, automatically returning to a release position thereof in which said locking teeth means engage said strap means.

* * * * *